(12) United States Patent
Breaux et al.

(10) Patent No.: US 11,521,282 B2
(45) Date of Patent: Dec. 6, 2022

(54) PROGRESS MONITORING ASSISTANT

(71) Applicant: Pearson Education, Inc., Bloomington, MN (US)

(72) Inventors: Kristina Breaux, Katy, TX (US); Thomas Witholt, Phoenix, AZ (US)

(73) Assignee: PEARSON EDUCATION, INC., Bloomington, MN (US)

( * ) Notice: Subject to any disclaimer, the term of this patent is extended or adjusted under 35 U.S.C. 154(b) by 0 days.

(21) Appl. No.: 17/394,663

(22) Filed: Aug. 5, 2021

(65) Prior Publication Data
US 2022/0051360 A1 Feb. 17, 2022

Related U.S. Application Data

(60) Provisional application No. 63/065,909, filed on Aug. 14, 2020.

(51) Int. Cl.
*G06Q 50/20* (2012.01)
*G06F 3/0482* (2013.01)
*G06F 9/451* (2018.01)
*H04L 67/01* (2022.01)
*G06F 3/14* (2006.01)

(52) U.S. Cl.
CPC ......... *G06Q 50/205* (2013.01); *G06F 3/0482* (2013.01); *G06F 9/451* (2018.02); *H04L 67/01* (2022.05); *G06F 3/14* (2013.01)

(58) Field of Classification Search
CPC ..... G06Q 50/205; G06F 9/451; G06F 3/0482; G06F 3/14; H04L 67/01
USPC .......................................................... 434/41
See application file for complete search history.

(56) References Cited

U.S. PATENT DOCUMENTS

| 9,558,004 | B1* | 1/2017 | Alonzo | G06F 9/5077 |
|---|---|---|---|---|
| 2006/0287906 | A1 | 12/2006 | McGillin | |
| 2011/0276396 | A1* | 11/2011 | Rathod | G06Q 20/10 |
| | | | | 707/706 |
| 2012/0034591 | A1 | 2/2012 | Morse, III et al. | |
| 2012/0276514 | A1 | 11/2012 | Haimowitz | |
| 2013/0111363 | A1* | 5/2013 | Linton | H04L 12/1831 |
| | | | | 715/753 |
| 2014/0006042 | A1 | 1/2014 | Keefe et al. | |
| 2018/0225600 | A1* | 8/2018 | Govindugari | G06F 9/451 |
| 2018/0315145 | A1* | 11/2018 | Darnell | H04L 9/3239 |
| 2019/0066525 | A1 | 2/2019 | Palau et al. | |
| 2019/0265843 | A1* | 8/2019 | Zhao | G06F 9/451 |
| 2020/0111188 | A1* | 4/2020 | McCallum | G06F 3/0482 |
| 2020/0111379 | A1* | 4/2020 | Cui | G06Q 50/205 |
| 2020/0125618 | A1* | 4/2020 | Yang | G06F 16/9537 |
| 2021/0390154 | A1* | 12/2021 | Wagner | G06Q 50/205 |
| 2021/0397987 | A1* | 12/2021 | Dixit | G09B 5/00 |
| 2021/0398235 | A1* | 12/2021 | Dixit | G06F 16/254 |
| 2022/0036253 | A1* | 2/2022 | Brutsche | G06K 9/6257 |

OTHER PUBLICATIONS

International Search Report and Written Opinon, International Application No. PCT/US2021/045973, dated Nov. 15, 2021.

* cited by examiner

*Primary Examiner* — William D Titcomb
(74) *Attorney, Agent, or Firm* — Quarles & Brady LLP

(57) ABSTRACT

Systems and methods of the present invention provide for generating and displaying a progress monitoring assistant to show the growth scale value score comparing two or more assessments and providing a preliminary interpretation of the comparison.

15 Claims, 9 Drawing Sheets

---

Welcome to the WIAT-4 Progress Monitoring Assistant

This Progress Monitoring Assistant analyzes changes in an examinee's WIAT-4 scores over time, such as for progress monitoring or evaluating response to intervention. When a WIAT-4 assessment is administered to an examinee at two or more points in time, the growth scale values and standard scores from each administration are compared to answer the following questions:

1. Is the examinee making progress relative to his/her past performance?
2. Is the examinee improving faster, slower, or at the same rate as his/her peers?
3. Do the score differences over time reflect a meaningful change?

The Progress Monitoring Assistant is provided in the Subtest 1-10 tabs in this file. The fields that require entry or selection appear white. Shaded cells will populate automatically based upon the information entered. Follow the step by step instructions below.

WARNING: This file uses many in-built formulas. Changing the contents of cells with a formula (shaded in gray or hidden) will prevent this tool from working properly, so many cells have been locked from editing.

Before editing the original Excel file, save a copy and edit the copy when entering examinee data.

Welcome to the WIAT-4 Progress Monitoring Assistant

This Progress Monitoring Assistant analyzes changes in an examinee's WIAT-4 scores over time, such as for progress monitoring or evaluating response to intervention. When a WIAT-4 assessment is administered to an examinee at two or more points in time, the growth scale values and standard scores from each administration are compared to answer the following questions:

1. Is the examinee making progress relative to his/her past performance?
2. Is the examinee improving faster, slower, or at the same rate as his/her peers?
3. Do the score differences over time reflect a meaningful change?

The Progress Monitoring Assistant is provided in the Subtest 1-10 tabs in this file. The fields that require entry or selection appear white. Shaded cells will populate automatically based upon the information entered. Follow the step by step instructions below.

> WARNING: This file uses many in-built formulas. Changing the contents of cells with a formula (shaded in gray or hidden) will prevent this tool from working properly, so many cells have been locked from editing.
>
> Before editing the original Excel file, save a copy and edit the copy when entering examinee data.

FIG. 3

| | Step by Step Instructions |
|---|---|
| Step 1 | Enter the examinee's first and last names in the appropriate cells. First name is used to populate interpretive statements. |
| Step 2 | Enter the examinee's date of birth using the listed format (MM/DD/YY). |
| Step 3 | Select the norms used from the drop-down list. Both grade-based and age-based norms are allowed, but the same norms need to be used throughout. Growth scale values are independent of norms used, but critical values and confidence intervals depend on the reference group (grade or age). |
| Step 4 | Select the level of confidence to be used with standard scores from the drop-down list (90% or 95%). The same level of confidence will be used throughout. |
| Step 5 | In the "Subtest #" tab, select the subtest or subtest component score from the drop-down list. Only one subtest can be assessed at a time in a single worksheet. Ten worksheets have been provided to accommodate progress monitoring across multiple subtests.<br><br>*Note.* Subtests with component scores (e.g. Sentence Composition) do not have subtest-level GSVs, so they cannot be used with the Progress Monitoring Assistant. Use the component scores instead (e.g., Sentence Building, Sentence Combining). |
| Step 6 | For the relevant subtest, enter the date of the first administration. Age at testing will automatically be calculated. |
| Step 7 | For the first administration, select the examinee's grade at testing from the drop-down list. A grade must be selected, even if using age-based norms. |
| Step 8 | For the first administration, enter the GSV and standard score in the appropriate cells.<br><br>To compare an examinee's scores from WIAT-III and WIAT-4 administrations, complete WIAT-III GSV to WIAT-4 GSV conversion before using the Progress Monitoring Assistant. Use the converted WIAT-4 GSV when comparing GSVs. Note that some subtests are not available. |
| Step 9 | Repeat Steps 6-8 for the second administration, only filling in data for the following: test date, grade at testing, GSV, and standard score. |
| Step 10 | Continue filling in administation data in the same way for additional administrations.<br>*Note.* This program compares administration data only to the previous administration. If you wish to compare data between non-consecutive administrations, you will need to enter the administration data as if the administrations to be compared were consecutive testings. |

FIG. 4

| | Demographics | |
|---|---|---|
| → | Enter Examinee First Name: | Sammy |
| → | Enter Examinee Last Name: | Sample |
| → | Enter Date of Birst (MM/DD/YY) | 12/15/10 |
| → | Select Norms: | Grade-Based |
| → | Select Confidence Interval: | 90% CI |

FIG. 5

| | WIAT-III GVS to WIAT-4 GVS conversion | | |
|---|---|---|---|
| | Select Subtest or component | Enter WIAT-III GSV | WIAT-4 GSV |
| → | | | |

FIG. 6

| Select Subtest or Component: | Word Reading | | | | | | | | |
|---|---|---|---|---|---|---|---|---|---|
| Administrations | Enter Test Date (MM/DD/YY) | DOB (MM/DD/YY) | Age Norms (automatically calculated) | Select Examinee's current grade or, if not in school, highest completed grade | Enter Growth Scale Value (GSV) | GSV Score Difference | GSV Critical Value | Significance of GSV Score Difference | Change in GSVs |
| 1 | 08/21/19 | 12/15/10 | 8:8-8:11 | 4 | 478 | | | | |
| 2 | 01/11/20 | 12/15/10 | 9:0-9:3 | 4 | 490 | 12 | 6 | Significant | Significant increase |
| 3 | 09/01/20 | 12/15/10 | 9:8-9:11 | 5 | 497 | 7 | 6 | Significant | Significant increase |
| 4 | 05/03/21 | 12/15/10 | 10:4-10:7 | 5 | 515 | 18 | 7 | Significant | Significant increase |
| 5 | 12/15/21 | 12/15/10 | 11:0-11:3 | 6 | 516 | 1 | 7 | Not significant | Not a significant change |

FIG. 7A

| Enter Subtest Standard Score | Standard Score Difference | Std Score Confidence Interval | Significance of Std Score Difference | Change in Std Scores | Data Interpretation |
|---|---|---|---|---|---|
| 80 | | 76-84 | | | |
| 85 | 5 | 81-89 | Not significant | Not a significant change | Sammy received a GSV of 478 on Word Reading at the first testing in grade 4 and a GSV of 490 at the second testing in grade 4, and the improvement in performance was significant. However, Sammy's standard scores did not significantly change, from 80 at the first testing to 85 at the second. These results suggest that the student's basic reading skills improved relative to personal performance but at a similar rate relative to peers. |
| 85 | 0 | 81-89 | Not significant | Not a significant change | Sammy received a GSV of 490 on Word Reading at the first testing in grade 4 and a GSV of 497 at the second testing in grade 5, and the improvement in performance was significant. However, Sammy's standard scores did not significantly change, from 85 at the first testing to 85 at the second. These results suggest that the student's basic reading skills improved relative to personal performance but at a similar rate relative to peers. |
| 95 | 10 | 91-99 | Significant | Significant increase | Sammy received a GSV of 497 on Word Reading at the first testing in grade 5 and a GSV of 515 at the second testing in grade 5, and the improvement in performance was significant. Sammy's standard scores increased significantly, from 85 at the first testing to 95 at the second. The student's basic reading skills improved relative to past performance and at a faster rate than peers. |
| 91 | 4 | 88-94 | Not significant | Not a significant change | Sammy received a GSV of 515 on Word Reading at the first testing in grade 5 and a GSV of 516 at the second testing in grade 6, but the change in performance was not significant. Sammy's standard scores did not change significantly either, from 95 at the first testing to 91 at the second. These resultes suggest that the student's basic reading skills have not changed significantly relative to either personal or peer's performance. |

FIG. 7B

| GSV | | GSV significant decline | |
|---|---|---|---|
| SS | | Significant decrease | Significant increase |
| Admin | | Significant increase | Significant decrease |
| 1 | Unexpected values: Growth scale values cannot significantly decrease at the same time that standard scores increase. Please ensure that all data are entered correctly, with the earliest administration listed under Administration 1, the next earliest in Administration 2, and so on. | Sammy received a GSV of 478 on Word Reading at the first testing in grade 4 and a GSV of 490 at the second testing in grade 4, and the decline in performance was significant. However, Sammy's standard scores significantly decreased, from 80 at the first testing to 85 at the second. These results suggest that the student's basic reading skills declined relative to both peers' and personal performance. When a student's GVSs decrease over time, it may indicate that the student showed no improvement in knowledge or skill proficiency, and some of the previously learned knowledge or skills were lost. |
| 2 | Unexpected values: Growth scale values cannot significantly decrease at the same time that standard scores increase. Please ensure that all data are entered correctly, with the earliest administration listed under Administration 1, the next earliest in Administration 2, and so on. | Sammy received a GSV of 490 on Word Reading at the first testing in grade 4 and a GSV of 497 at the second testing in grade 5, and the decline in performance was significant. Sammy's standard scores did not change significantly, from 85 at the first testing to 85 at the second. These results suggest that the student's basic reading skills declined relative to personal performance but not relative to peers. When a student's GSVs decrease over time, it may indicate that the student showed no improvement in knowledge or skill proficiency, and some of the previously learned knowledge or skills were lost. |
| 3 | Unexpected values: Growth scale values cannot significantly decrease at the same time that standard scores increase. Please ensure that all data are entered correctly, with the earliest administration listed under Administration 1, the next earliest in Administration 2, and so on. | Sammy received a GSV of 497 on Word Reading at the first testing in grade 5 and a GSV of 515 at the second testing in grade 5, and the decline in performance was significant. Sammy's standard scores did not change significantly, from 85 at the first testing to 95 at the second. These results suggest that the student's basic reading skills declined relative to performance but not relative to peers. When a student's GSVs decrease over time. it may indicate that the student showed no improvement in knowledge or skill proficiency, and some of the previously learned knowledge or skills were lost. |

FIG. 8A

| | GSV significant decline | |
|---|---|---|
| Not a significant change | | |
| Not a significant change | Remains the same | |
| Sammy received a GSV of 478 on Word Reading at the first testing in grade 4 and a GSV of 490 at the second testing in grade 4, and the decline in performance was significant. However, Sammy's standard scores did not significantly change, from 80 at the first testing to 85 at the second. These results suggest that the student's basic reading skills improved relative to personal performance but at a similar rate relative to peers. When a student's GVSs decrease over time, it may indicate that the student showed no improvement in knowledge or skill proficiency, and some of the previously learned | Unexpected values: Growth scale values cannot significantly decrease at the same time that standard scores remain in the same. Please ensure that all administration data are entered correctly with the earliest administration listed under Administration 1, the next earliest in Administration 2, and so on. | Sammy received a GSV of 478 on Word Reading at the first testing in grade 4 and a GSV of 490 at the second testing in grade 4, and the improvement in performance was significant. However, Sammy's standard scores increased significantly, from 80 at the first testing to 85 at the second. The student's basic reading skills improved relative to past performance and at a faster rate than peers. |
| Sammy received a GSV of 490 on Word Reading at the first testing in grade 5 and a GSV of 497 at the second testing in grade 5, and the decline in performance was significant. Sammy's standard scores did not change significantly, from 85 at the first testing to 85 at the second. These results suggest that the student's basic reading skills declined relative to personal performance but not relative to peers. When a student's GSVs decrease over time, it may indicate that the student showed no improvement in knowledge or skill proficiency, and some of the previously learned | Unexpected values: Growth scale values cannot significantly decrease at the same time that standard scores remain in the same. Please ensure that all administration data are entered correctly with the earliest administration listed under Administration 1, the next earliest in Administration 2, and so on. | Sammy received a GSV of 490 on Word Reading at the first testing in grade 4 and a GSV of 497 at the second testing in grade 5, and the improvement in performance was significant. However, Sammy's standard scores increased significantly, from 85 at the first testing to 85 at the second. The student's basic reading skills improved relative to past performance and at a faster rate than peers. |
| Sammy received a GSV of 497 on Word Reading at the first testing in grade 5 and a GSV of 515 at the second testing in grade 5, and the decline in performance was significant. Sammy's standard scores did not change significantly, from 85 at the first testing to 95 at the second. These results suggest that the student's basic reading skills declined relative to performance but not relative to peers. When a student's GSVs decrease over time, it may indicate that the student showed no improvement in knowledge or skill proficiency, and some of the previously learned | Unexpected values: Growth scale values cannot significantly decrease at the same time that standard scores remain in the same. Please ensure that all administration data are entered correctly with the earliest administration listed under Administration 1, the next earliest in Administration 2, and so on. | Sammy received a GSV of 497 on Word Reading at the first testing in grade 5 and a GSV of 515 at the second testing in grade 5, and the improvement in performance was significant. However, Sammy's standard scores increased significantly, from 85 at the first testing to 95 at the second. The student's basic reading skills improved relative to past performance and at a faster rate than peers. |
| Sammy received a GSV of 515 on Word Reading at the first | | |

FIG. 8B

PROGRESS MONITORING ASSISTANT

CROSS-REFERENCE TO RELATED APPLICATION

This application claims the benefit of priority from provisional application No. 63/065,909, filed under the same title on Aug. 14, 2020, the entire contents of which is incorporated herein by reference

FIELD OF THE INVENTION

This disclosure relates to the field of systems and methods configured to generate and display a growth scale value score, and more particularly to generating and displaying a progress monitoring assistant to show the growth scale value score comparing two or more assessments.

SUMMARY OF THE INVENTION

In the disclosed embodiments, when the same test (or different forms of the same test) are administered two or more times with the same student, the growth scale values (GSVs) from each test administration are compared to determine if there is a significant increase or decrease.

To accomplish this, the disclosed embodiments compare this growth score to a standard scale. In some embodiments, the GSV may be calculated using a spreadsheet or other client-side software into which clinicians enter test result information. The spreadsheet file includes lookup data tables and generates the growth score comparisons. The novelty is in the visualization tools and dynamic statements that will be created using the results, thereby providing clinicians, or other users, information to help interpret the results.

The disclosed embodiments therefore provide a growth scale value (GSV) analyzer that compares GSV scores over time in a way that is easy to use and customer friendly. Users may use this to track their students' progress over time and report results. This invention replaces more costly GSV reports. The primary value in this tool is its ease of use for tracking and analyzing student progress data on a given test, and its potential to include a student's GSV data from multiple tests in one file. The GSV analyzer is unique because it can be used by digital customers using products such as Pearson's Q-global or Q-interactive.

The above features and advantages of the present invention will be better understood from the following detailed description taken in conjunction with the accompanying drawings.

BRIEF DESCRIPTION OF THE DRAWINGS

FIG. 3 illustrates a non-limiting example user interface for a progress monitoring assistant.

FIG. 4 illustrates a non-limiting example user interface for a progress monitoring assistant.

FIG. 5 illustrates a non-limiting example user interface for a progress monitoring assistant.

FIG. 6 illustrates a non-limiting example user interface for a progress monitoring assistant.

FIG. 7A-7B illustrates a non-limiting example user interface for a progress monitoring assistant.

FIGS. 8A-8B illustrate a non-limiting example user interface for a progress monitoring assistant.

DETAILED DESCRIPTION

Figure 1:
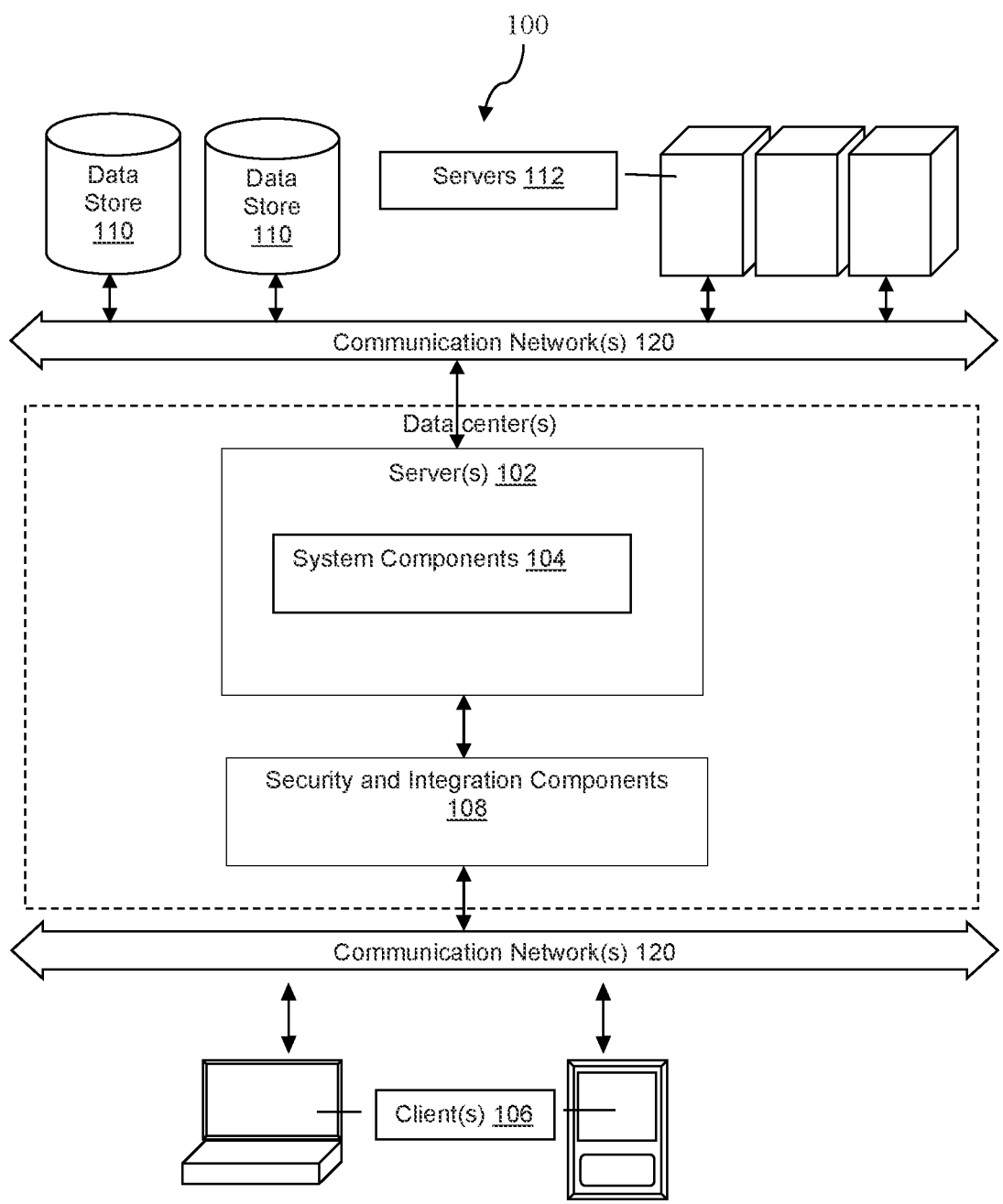
FIG. 1 illustrates a system level block diagram for a progress monitoring assistant.

The present inventions will now be discussed in detail with regard to the attached drawing figures that were briefly described above. In the following description, numerous specific details are set forth illustrating the Applicant's best mode for practicing the invention and enabling one of ordinary skill in the art to make and use the invention. It will be obvious, however, to one skilled in the art that the present invention may be practiced without many of these specific details. In other instances, well-known machines, structures, and method steps have not been described in particular detail in order to avoid unnecessarily obscuring the present invention. Unless otherwise indicated, like parts and method steps are referred to with like reference numerals.

Growth scale values (GSVs) are scores that are used to measure growth/change in students' performance on a test over time. Traditionally, GSV reports were the only way for customers to determine whether a difference between two GSVs is significant because hand calculation would be overly complex. However, clinical assessment products may not provide digital reports to analyze growth scale values because these reports are not utilized enough to justify the development cost. Without this information, instructors may have no defensible means of determining whether a student has made meaningful progress over time relative to their own past performance. To provide a low investment alternative, the disclosed embodiments may include a GSV Analyzer (in a spreadsheet, such as Microsoft Excel, in some embodiments, as a non-limiting example) that analyzes GSV scores over time in a way that is easy to use and customer friendly. The comparison between GSVs has historically been computed using digital score reports (e.g., within Pearson's Q-global or Q-interactive).

In the disclosed embodiments, when the same test (or different forms of the same test) are administered two or more times with the same student, the growth scale values from each test administration are compared to determine if there is a significant increase or decrease.

To accomplish this, the disclosed embodiments provide a method of creating a growth score (e.g. how much a student has improved or grown over a series of tests) and compares this growth score to a standard scale. In some embodiments, the GSV may be calculated using a spreadsheet or other client-side software into which clinicians enter test result information. The novelty is in the visualization tools and dynamic statements that will be created using the results, thereby providing clinicians, or other users, information to help interpret the results.

The disclosed embodiments therefore provide a growth scale value (GSV) analyzer that compares GSV scores over time in a way that is easy to use and customer friendly. Users may use this to track their students' progress over time and report results. This invention replaces the more costly GSV reports described above. The primary value in this tool is its ease of use for tracking and analyzing student progress data on a given test, and its potential to include a student's GSV data from multiple tests in one file. The GSV analyzer is unique because it can be used by digital customers using products such as Pearson's Q-global or Q-interactive.

In a first non-limiting example use case of the disclosed embodiments, a practitioner may need to determine if a student with an intellectual disability has made progress in language and academic skills over the last several years in a special education program. The GSV analyzer may be used to quickly compare GSV scores obtained across multiple test administrations. In another example use case, a special education teacher may be implementing a targeted intervention program with a student and needs to determine if meaningful progress has been made over the course of the semester. The teacher enters the GSVs from before/after the intervention to determine if the change in GSVs is significant.

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone networks (PSTNs), a virtual network, etc. Network 120 may use any available protocols, such as (e.g., transmission control protocol/Internet protocol (TCP/IP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Figure 2:
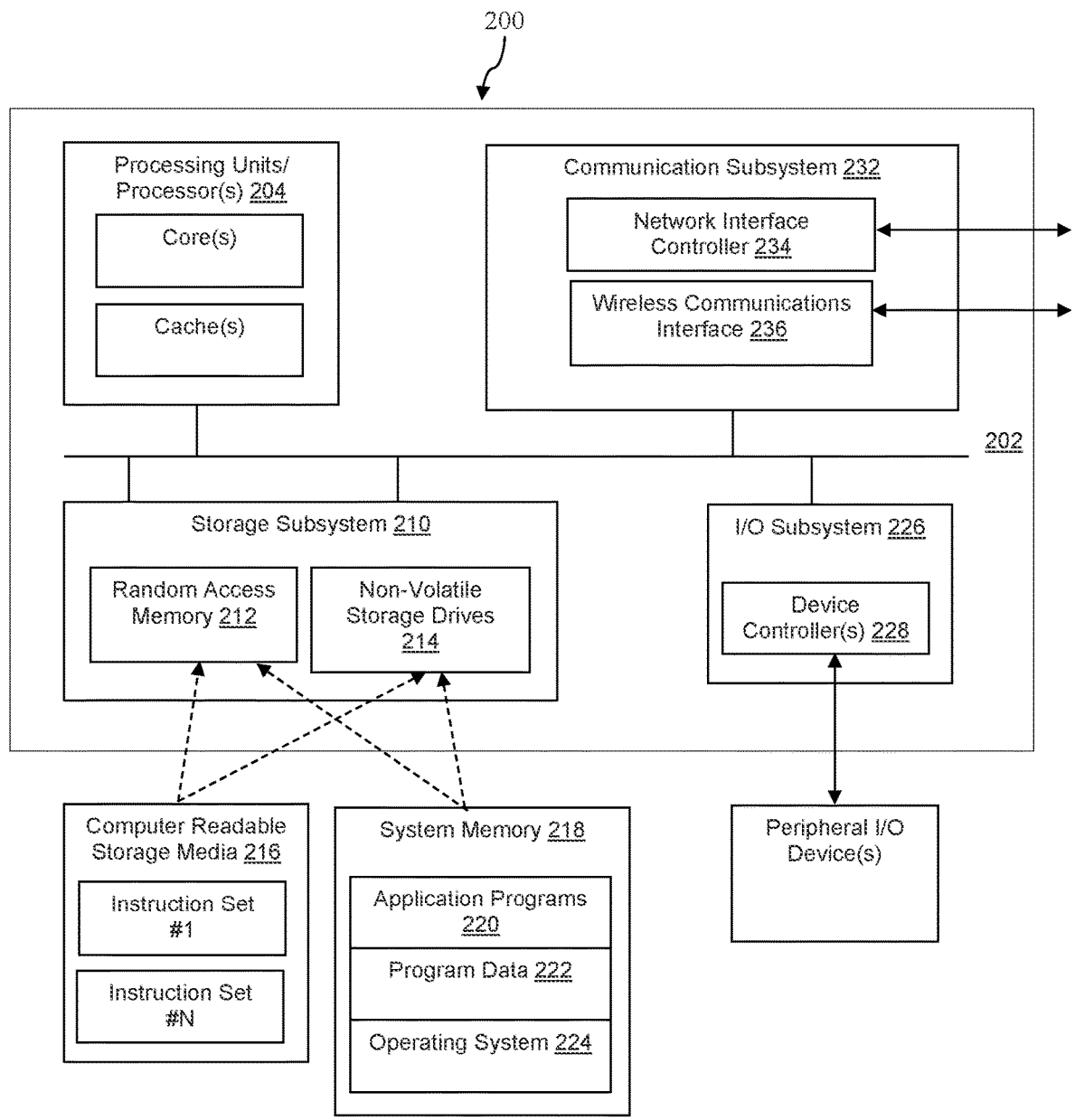
FIG. 2 illustrates a system level block diagram for a progress monitoring assistant.

The embodiments shown in FIGS. 1-2 are thus one example of a distributed computing system and is not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser based applications and/or standalone software applications, such as mobile device applications. Client devices 106 may receive client applications from server 102 or from other application providers (e.g., public or private application stores).

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users, As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.).

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML, encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include, indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

The disclosed embodiments use programmed logic that is specific to a clinical assessment product that provide GSVs to instructors. The basic logic structure can be applied to another product, but the critical values within the logic may be product specific. The instructor inputs include the administration test date, the learner's age/grade at testing, the corresponding age range of the learner, and the GSV scores obtained from that test/subtest administration.

The instructor may enter data from as many test administrations as they have completed for a learner. The tool will then calculate the GSV score difference, and then report the GSV critical value, whether the GSV score difference is significant, and if so, the direction of the difference (increase or decrease). These data may be saved under a learner's record. The instructor may save separate GSV Analyzer files for each learner in their caseload.

An example of favorable results achieved by the disclosed embodiments may include an incentive for instructors to look at GSVs. Currently, utilization of GSVs is low (based on utilization data in products such as Pearson's Q-global and market research) because many instructors do not realize that only GSVs provide a measure of a student's progress over time—standard scores and percentiles do not. However, most instructors compare a learner's standard scores over time, thinking that this provides information about growth. In fact, this practice leads to incorrect conclusions about a learner's performance over time and inappropriate recommendations for next steps. From an efficacy standpoint, this GSV Analyzer may encourage use of GSVs and discourage the misinterpretation of other types of scores.

A second example of favorable results may include offering the tools in the disclosed embodiments to cross-promote additional products. For example, the disclosed embodiments may be marketed as a decision support tool, wherein the GSV analyzer could encourage practitioners to purchase additional products, or a newest revision of the products, in order to help instructors make better decisions for their learners.

As seen in FIGS. 3-7B, the disclosed embodiments may include a progress monitoring assistant, which analyzes changes in an examinee's standardized test scores (e.g., WIAT-4 scores) over time, such as for progress monitoring or evaluating response to intervention. When an assessment (e.g., WIAT-4) is administered to an examinee at two or more points in time, the growth scale values and standard scores from each administration are compared to answer the following questions: 1. "Is the examinee making progress relative to his/her past performance?"; 2. "Is the examinee improving faster, slower, or at the same rate as his/her peers?"; and 3. Do the score differences over time reflect a meaningful change?".

As seen in FIGS. 7A-7B, the user may be provided with means to enter data which is then analyzed for a subtest. It should be noted that the progress monitoring assistant may provide a user with any number of additional subtests (e.g., 10 additional subtests). In embodiments in which the disclosed method steps are performed within a spreadsheet, the spreadsheet may provide subtest 1-10 tabs in this file. The fields that require entry or selection may appear white, while shaded cells may populate automatically based upon the information entered, using the data table information described in more detail below. In some embodiments, the spreadsheet or other software logic may use multiple in-built formulas, so that changing the contents of cells with a formula (shaded in gray or hidden in FIGS. 7A-7B) will prevent this tool from working properly. In some embodiments, many cells may therefore be locked from editing.

As seen in FIGS. 3-4, a user of the disclosed system may be presented with multiple instructions to review one or more users' GSV scores. The steps taken by the system, spreadsheet, software, etc. to determine these scores will be described below.

As seen in FIG. 5, the user (e.g., an instructor and/or examiner) may enter the examinee's first and last names in the appropriate cells. In some embodiments, the entered first name may be used to populate interpretive statements. As a non-limiting example seen in FIG. 5, the appropriate cells may include the instruction to "Enter Examinee First Name" as well as an input cell into which a user such as in instructor may input a first name, such as "Sammy." Similarly, the appropriate cells may include the instruction to "Enter Examinee Last Name" as well as an input cell into which the user may input a last name, such as "Sample."

As seen in FIG. 5, the user may enter the examinee's date of birth using the listed format (MM/DD/YY). As a non-limiting example seen in FIG. 5, a user may input the birthdate "12/15/10" into the Enter Date of Birth cell.

As seen in FIG. 5, the user may select the norms used, possibly from a drop-down list. In some embodiments, both grade-based and age-based norms may be allowed, but the same norms need to be used throughout. Growth scale values may be independent of norms used, but critical values and confidence intervals may depend on the reference group (grade or age). In the non-limiting example shown in FIG. 5, the user has selected Grade-Based norms.

As seen in FIG. 5, the user may select the level of confidence to be used with standard scores from the drop-down list (e.g., 90% or 95%). The same level of confidence will be used throughout. In the non-limiting example in FIG. 5, the user has selected a 90% confidence interval.

As seen in FIG. 6, in embodiments where the assessment administered is the WIAT-4, the disclosed embodiments may include a WIAT-III to WIAT-4 conversion tool. In these embodiments, a user may select a subtest or component, and enter a WIAT-III GSV. In these embodiments, the system may then display a WIAT-4 GSV.

The user may then select a subtest (e.g., using a tab for the subtest in embodiments using a spreadsheet) and enter information for that subtest. In some embodiments, only one subtest can be assessed at a time in a single worksheet. In some embodiments, multiple worksheets may be provided to accommodate progress monitoring across multiple subtests. In each of these subtests, the user may select the subtest or subtest component score from the drop-down list. As a non-limiting example, in FIG. 7A, the user has selected the Word Reading subtest.

It should be noted that subtests with component scores (e.g., Sentence Composition) do not have subtest-level GSVs, so they cannot be used with the progress monitoring assistant. However, users may use component scores instead (e.g., Sentence Building, Sentence Combining, etc.).

For the relevant subtest, a user may enter the date of the first administration of the subtest. The disclosed system may then automatically calculate the age at testing, using the examinee's birthdate, previously provided, and the provided data of the first administration of the subtest. Thus, in the non-limiting example seen in FIG. 7A, the user has input 8/21/19 as the date of the first administration of the Word Reading subtest, and the system, using the previously provided birthdate provided in FIG. 5 of 12/15/10, has automatically calculated the user's Age Norms for the first administration as 8:8-8:11. These values may be provided by a lookup table, as described in more detail below.

For the first administration, a user may select the examinee's grade at testing from the drop-down list. In some embodiments, such as that seen in FIG. 7A, a grade must be selected, even if using age-based norms.

For the first administration, the user may enter the GSV and standard score in the appropriate cells. In FIG. 7A, the user has input 478 for the GSV, and 80 for the standard score.

It should be noted that in embodiments that compare an examinee's scores from WIAT-III and WIAT-4 administrations, a user should complete the WIAT-III GSV to WIAT-4 GSV conversion seen in FIG. 6 before using the Progress Monitoring Assistant. The user should then use the converted WIAT-4 GSV when comparing GSVs. In some embodiments, some of the subtests may not be available.

The user may repeat the disclosed steps above for a second or subsequent administration of the subtest or component, only filling in data for the following: test date, grade at testing, GSV, and standard score. As a non-limiting example, in FIGS. 7A-7B, the second administration has user input including a test date, grade at testing, GSV, and standard score of 1/11/20, 4, 490, and 85, respectively.

The user may continue filling in administration data in the same way for additional administrations. For example, in FIGS. 7A-7B, the user has input 3 additional administrations. It should be noted that the system in the disclosed embodiments compares administration data only to the previous administration. However, users may wish to compare data between non-consecutive administrations, and in the embodiments shown in FIGS. 7A-7B will need to enter the administration data as if the administrations to be compared were consecutive testings.

The disclosed embodiments may include lookup data tables used to generate data interpretation of user inputs and calculations derived from user inputs, which will be described in greater detail below. The use of these lookup tables is important to provide consistent data across subtests and components.

The steps for the use of such lookup data, possibly from lookup data tables, may include the user filling out demographic information for the learner, as described above. Thus, the user may provide a first name, last name, date of birth, the type of norms that will be used (e.g., age or grade based), and a confidence interval (e.g., 90% or 95%) around a standard score.

These may be used to display data relevant to the examinee, through each of the available subtests. As a non-limiting example, in FIGS. 7A-7B, the DOB field for each subtest is populated from the field receiving the input in response to the "Enter Date of Birth" instruction seen in FIG. 5. Similarly, the name displayed in the Data Interpretation field seen in FIG. 7B is populated from the field receiving the input in response to the "Enter Examinee First Name" instruction seen in FIG. 5.

The purpose of populating these fields and variables with this provided data is to be consistent across subtests and administrations, as name, date of birth, norms, confidence intervals, etc. need to be consistent between subtests and administrations.

The WIAT-III to WIAT-4 conversion may include a simple lookup from a system that measures a particular value in WIAT-4 differently than it did for WIAT-III. This conversion using these lookup tables may be especially useful for older administrations where the output is different than that used in newer administrations.

For each of the subtests, the system may access lookup tables. As a non-limiting example, the selection of the subtest or component (e.g., Word Reading in FIG. 7A), may drive the selected lookup table, and the specific data within the lookup table to determine the data displayed within the auto-populated cells, such as that seen in FIGS. 7A-7B.

The disclosed system may use the birthdate data provided in FIG. 5 to calculate an age of the examinee in months. This data may be further utilized to access a lookup table to determine an age band for the examinee for normative purposes.

The age and grade based norms, provided through a combination of the input date of birth, the calculation of the user's age in months, the looked-up age band, and the selected grade (e.g., 4 in the example first two administrations in the example embodiment seen in FIG. 7A), may be used to lookup an age and/or grade-based scoring to find the proper significance levels for GSV or a standard score.

The user may therefore enter the growth scale value and enter the subtest standard score (e.g., GSV of 478 and 490, and standard score of 80 and 85 in FIGS. 7A-7B). These values may be any value within a range of acceptable values, and are then used to generate and automatically populate the instructions displayed in the data interpretation, as well as the additional auto-generated cells displayed in FIGS. 7A-7B (e.g., GSV Score Difference, GSV Critical Value, Significance of GSV Score Difference, Change in GSVs, Standard Score Difference, Std Score Confidence Interval, Significance of Std Score Difference, Change in Std Scores, Data Interpretation). Conversely, if no data is entered for GSV and standard score, these fields will not be automatically populated based on lookup table data.

In order for a score difference to be populated, a previous administration must exist. A score difference (e.g., a GSV score difference and/or a standard score difference) may be determined by looking up the difference between these two values of a current score and a previous score. In some embodiments, only scores from two adjacent administrations will be compared, but may include instructions to enter non-sequential administrations as if they were sequential in order to determine a score difference.

The critical value field may provide users with data used to determine whether the difference is significant. For GSVs, the critical value may be averaged between the current and previous administrations, so the critical value is needed for both the current and previous administrations in order to determine significance. Significance may be determined via a lookup table for significance. In some embodiments, a significance lookup table may exist for each of the subtests, which reference an age and/or grade of each examinee at the time of the administration of the subtest. In addition, an additional lookup table for GSVs may exist, in which a critical value for each subtest is provided, taking as input from each admin an age and grade for the examinee. The lookup table may then provide the value for the critical value, grade or age for each administration within each subtest. Grade based norms and age based norms may also be used. The table may be referenced matching the chosen grade and age with the subtest.

As seen in FIGS. 7A-7B, the critical value is analyzed to determine if the critical value is above the average of the score difference value and the critical value. If so, it is determined to be significant. For example, if it's an increase, it is determined whether or not it is a significant increase, and if it's a decrease, then it's determined whether or not it is a significant decrease.

As seen in FIGS. 7A-7B, the disclosed system is therefore configured to determine if the value is significant, and if so, what the direction of that significance is. If it is not significant, this is also displayed to the user. As a non-limiting example, if there is only a one point difference, this will not be considered a significant change.

Thus, as seen in FIGS. 7A-7B, the automatically generated data is also used to populate the variables so that the data within the data interpretation displays the values within these cells.

A different process may be used for looking up the significance of the change in the provided standard score. The disclosed system may determine whether the confidence intervals overlap or not. In these embodiments, the system may be configured to look up the lower end of the confidence interval and the higher end of the confidence interval within the appropriate lookup tables. The significance determines whether the higher end and the lower end of the difference overlap or do not overlap. If it is determined that they overlap, then it's not significant, and if they don't overlap, then the significance of the difference is significant, and if it's not, then the difference is not significant. As above, the Change in Std Scores (shown in FIG. 7B) displays a combination of the significance, and in what direction.

The data interpretation column for each administration may use the provided and calculated values to provide a data interpretation for display to the user, or for consumption from other software modules.

To determine the content to be displayed in the disclosed system, the system may provide one or more data tables containing subtest data for each of the provided subtests, including its own interpretive matrix or rubric. The interpretive matrix or rubric may be used to select the correct content for the data interpretation, based on the results of the data provided by the user and generated by the system according to this provided data.

In some embodiments, the content to be displayed in the data interpretation cells may include variables, so that, as non-limiting examples, the data interpretation may include the user's name, an indication of a significant increase in the standard score, (i.e., the standard score has increased), and so forth.

In some embodiments, this content may include instructions to the user if they have provided incorrect information. Otherwise, the system may identify the provided or automatically generated information, and insert that data into the interpretive result identified for the administration according to the lookup table, the provided data from the user, and the calculations made based on this data.

FIGS. 8A-8B demonstrate a non-limiting example embodiments of multiple options that may be used to populate the content of the data interpretation cell within FIG. 7B. As seen in FIGS. 8A-8B, the options may be selected based on the results of the calculations within the system prior to the data interpretation. As non-limiting examples, the content displayed may be displayed according to whether there was a significant change, and whether the significant change was a significant increase a significant decrease. Additional content may be selected based on whether there is not a significant change or if it stays the same.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system comprising:
a database coupled to a network of computing devices, and storing, in association:
a plurality of score changes; and
a plurality of data interpretation content, each associated, in the database, with one of the plurality of score changes;
a server comprising a computing device coupled to a network and comprising at least one processor executing instructions within memory which, when executed, cause the system to:
generate a graphical user interface (GUI), transmitted through the network and displayed on a client device coupled to the network, the GUI comprising:
a first GUI component configured to receive a first user input comprising a first score data for a first administration of a first assessment; and
a second GUI component configured to receive a second user input comprising a second score data for a second administration of a second assessment;
receive, through the network from the client device, the first user input and the second user input;
identify a first score change between the first score data and the second score data, the first score change matching a second score change in the plurality of score changes;
execute a database command selecting, from the plurality of data interpretation content, a data interpretation content associated, in the database, with the second score change; and
transmit the data interpretation content through the network for display on the client device.

2. The system of claim 1, wherein the instructions, when executed by the at least one processor, further cause the system to generate a second GUI comprising:
a third GUI component configured to receive a third user input comprising a name of a user;
a fourth GUI component configured to receive a fourth user input comprising a date of birth of the user;
a fifth GUI component configured to receive a selection of a grade-based norm or an age-based norm for the user; and
a sixth GUI component configured to receive a selection of a confidence interval for the user.

3. The system of claim 2, wherein the instructions, when executed by the at least one processor, further cause the system to:
receive, from the GUI:
a selection of a subtest or component of the first assessment or the second assessment; and
a test date of the subtest or component;
calculate, based on the test date and the date of birth of the user, the age-based norm for the user; and
transmit the age-based norm through the network for display on the GUI.

4. The system of claim 3, wherein the instructions, when executed by the at least one processor, further cause the system to:
receive, from the GUI:
a selection of a current grade for the user; and
a fifth user input comprising a growth scale value for the user for the second administration of the second assessment in association with the subtest or component;
calculate, based on a difference between the growth scale value for the second administration of the second assessment and the growth scale value for the first administration of the first assessment:
the first score change associated with the growth scale value;
a critical value for the growth scale value;
a significance of the first score change; and
an increase, a decrease, or a non-significant change in the difference between the growth scale value for the second administration of the second assessment and the growth scale value for the first administration of the first assessment;
transmit the first score change, the critical value, the significance, and the increase, the decrease, or the non-significant change through the network for display on the GUI.

5. The system of claim 3, wherein the instructions, when executed by the at least one processor, further cause the system to:
receive, from the GUI, a fifth user input comprising a standard score for the second administration of the second assessment in association with the subtest or component;
calculate, based on a difference between the standard score for the second administration of the second assessment and the standard score for the first administration of the first assessment:
the first score change associated with the standard score;
a confidence interval for the standard score;
a significance of the first score change; and
an increase, a decrease, or a non-significant change in the difference between the standard score for the second administration of the second assessment and the standard score for the first administration of the first assessment;
transmit the first score change, the critical value, the significance, and the increase, the decrease, or the non-significant change through the network for display on the GUI.

6. A method comprising:
storing in association, by a server comprising a computing device coupled to a network of computing devices and comprising at least one processor executing instructions within memory, within a database coupled to the network:
a plurality of score changes; and
a plurality of data interpretation content, each associated, in the database, with one of the plurality of score changes;
generating, by the server, a graphical user interface (GUI), transmitted through the network and displayed on a client device coupled to the network, the GUI comprising:

a first GUI component configured to receive a first user input comprising a first score data for a first administration of a first assessment; and a second GUI component configured to receive a second user input comprising a second score data for a second administration of a second assessment;

receiving, by the server through the network from the client device, the first user input and the second user input;

identifying, by the server, a first score change between the first score data and the second score data, the first score change matching a second score change in the plurality of score changes;

executing, by the server, a database command selecting, from the plurality of data interpretation content, a data interpretation content associated, in the database, with the second score change; and transmitting, by the server, the data interpretation content through the network for display on the client device.

7. The method of claim 6, further comprising the step of generating, by the server, a second GUI comprising:

a third GUI component configured to receive a third user input comprising a name of a user;

a fourth GUI component configured to receive a fourth user input comprising a date of birth of the user;

a fifth GUI component configured to receive a selection of a grade-based norm or an age-based norm for the user; and a sixth GUI component configured to receive a selection of a confidence interval for the user.

8. The method of claim 7, further comprising the steps of:
receiving, by the server from the GUI:
a selection of a subtest or component of the first assessment or the second assessment; and
a test date of the subtest or component;

calculating, by the server based on the test date and the date of birth of the user, the age-based norm for the user; and transmitting, by the server, the age-based norm through the network for display on the GUI.

9. The method of claim 8, further comprising the steps of:
receiving, by the server from the GUI:
a selection of a current grade for the user; and
a fifth user input comprising a growth scale value for the user for the second administration of the second assessment in association with the subtest or component;

calculating, by the server based on a difference between the growth scale value for the second administration of the second assessment and the growth scale value for the first administration of the first assessment:
the first score change associated with the growth scale value;
a critical value for the growth scale value;
a significance of the first score change; and
an increase, a decrease, or a non-significant change in the difference between the growth scale value for the second administration of the second assessment and the growth scale value for the first administration of the first assessment;

transmit the first score change, the critical value, the significance, and the increase, the decrease, or the non-significant change through the network for display on the GUI.

10. The method of claim 8, further comprising the steps of:

receiving, by the server from the GUI, a fifth user input comprising a standard score for the second administration of the second assessment in association with the subtest or component;

calculating, by the server based on a difference between the standard score for the second administration of the second assessment and the standard score for the first administration of the first assessment:
the first score change associated with the standard score;
a confidence interval for the standard score;
a significance of the first score change; and
an increase, a decrease, or a non-significant change in the difference between the standard score for the second administration of the second assessment and the standard score for the first administration of the first assessment;

transmitting, by the server, the first score change, the critical value, the significance, and the increase, the decrease, or the non-significant change through the network for display on the GUI.

11. A system comprising a server, comprising a computing device coupled to a network of computing devices and comprising at least one processor executing instructions within memory, the server being configured to:
store in association, in a database coupled to the network:
a plurality of score changes; and
a plurality of data interpretation content, each associated, in the database, with one of the plurality of score changes;

generate a graphical user interface (GUI), transmitted through the network and displayed on a client device coupled to the network, the GUI comprising:
a first GUI component configured to receive a first user input comprising a first score data for a first administration of a first assessment; and
a second GUI component configured to receive a second user input comprising a second score data for a second administration of a second assessment;

receive, through the network from the client device, the first user input and the second user input;

identify a first score change between the first score data and the second score data, the first score change matching a second score change in the plurality of score changes;

execute a database command selecting, from the plurality of data interpretation content, a data interpretation content associated, in the database, with the second score change; and transmit the data interpretation content through the network for display on the client device.

12. The system of claim 11, wherein the server is further configured to generate a second GUI comprising:
a third GUI component configured to receive a third user input comprising a name of a user;
a fourth GUI component configured to receive a fourth user input comprising a date of birth of the user;
a fifth GUI component configured to receive a selection of a grade-based norm or an age-based norm for the user; and
a sixth GUI component configured to receive a selection of a confidence interval for the user.

13. The system of claim 12, wherein the server is further configured to:
receive, from the GUI:
a selection of a subtest or component of the first assessment or the second assessment; and a test date of the subtest or component;

calculate, based on the test date and the date of birth of the user, the age-based norm for the user; and transmit the age-based norm through the network for display on the GUI.

14. The system of claim 13, wherein the server is further configured to:

receive, from the GUI:

a selection of a current grade for the user; and a fifth user input comprising a growth scale value for the user for the second administration of the second assessment in association with the subtest or component;

calculate, based on a difference between the growth scale value for the second administration of the second assessment and the growth scale value for the first administration of the first assessment:

the first score change associated with the growth scale value;

a critical value for the growth scale value;

a significance of the first score change; and an increase, a decrease, or a non-significant change in the difference between the growth scale value for the second administration of the second assessment and the growth scale value for the first administration of the first assessment;

transmit the first score change, the critical value, the significance, and the increase, the decrease, or the non-significant change through the network for display on the GUI.

15. The system of claim 13, wherein the server is further configured to:

receive, from the GUI, a fifth user input comprising a standard score for the second administration of the second assessment in association with the subtest or component;

calculate, based on a difference between the standard score for the second administration of the second assessment and the standard score for the first administration of the first assessment:

the first score change associated with the standard score;

a confidence interval for the standard score;

a significance of the first score change; and an increase, a decrease, or a non-significant change in the difference between the standard score for the second administration of the second assessment and the standard score for the first administration of the first assessment;

transmit the first score change, the critical value, the significance, and the increase, the decrease, or the non-significant change through the network for display on the GUI.

* * * * *